May 16, 1967   SHOHEI YAMAMOTO ETAL   3,320,094
PRIMARY BATTERIES

Filed Feb. 24, 1964   6 Sheets-Sheet 1

*Inventors*
Shohei Yamamoto
Katsujiro Nakaiwa
Shosuke Kawauchi
Hideharu Kanai

By Stevens, Davis, Miller & Mosher
ATTORNEYS

Inventors
Shohei Yamamoto
Katsujiro Nakaiwa
Shosuke Kawauchi
Hideharu Kanai

By Stevens, Davis, Miller & Mosher

ATTORNEYS

Inventors
Shohei Yamamoto
Katsujiro Nakaiwa
Shosuke Kawauchi
Hideharu Kanai

By Stevens, Davis, Miller & Mosher
ATTORNEYS

May 16, 1967  SHOHEI YAMAMOTO ETAL  3,320,094
PRIMARY BATTERIES
Filed Feb. 24, 1964  6 Sheets-Sheet 6

Inventors
Shohei Yamamoto
Katsujiro Nakaiwa
Shosuke Kawauchi
Hideharu Kanai

By Stevens, Davis, Miller + Mosher
ATTORNEYS

United States Patent Office 3,320,094
Patented May 16, 1967

3,320,094
PRIMARY BATTERIES
Shohei Yamamoto, Osaka, Katsujiro Nakaiwa, Moriguchi-shi, Shosuke Kawauchi, Neyagawa-shi, and Hideharu Kanai, Kyoto, Japan, assignors to Matsushita Electric Industrial Co., Ltd., Osaka, Japan, a corporation of Japan
Filed Feb. 24, 1964, Ser. No. 346,674
Claims priority, application Japan, Feb. 28, 1963, 38/14,487; Mar. 26, 1963, 38/21,948
3 Claims. (Cl. 136—133)

This invention relates to primary batteries, and more particularly to metal-clad dry cells.

An object of the present invention is to provide a metal-sealed dry cell having a very long useful life. The useful life of the present dry cell is almost double that of conventional metal-sealed dry cells in average, and over three times that of the latter under heavy load, so that every kind of electrical appliances employing the present dry cells can have stable performances.

Another object of the present invention is to provide a metal-seal dry cell with no fear of electrolyte leakage.

A further object of the present invention is to provide a metal-seal dry cell that has weather-proofness of wide extent, say, from $-15°$ C. to $+100°$ C. in temperature, and from zero percent to 100% in humidity.

A still further object of the present invention is to provide a dry-cell which shows little aging or loss in performance after storage for a very long time.

There are other objects and particularities of the present invention, which will be made obvious from the following detailed description, with reference to the accompanying drawings; in which.

Figure 1:
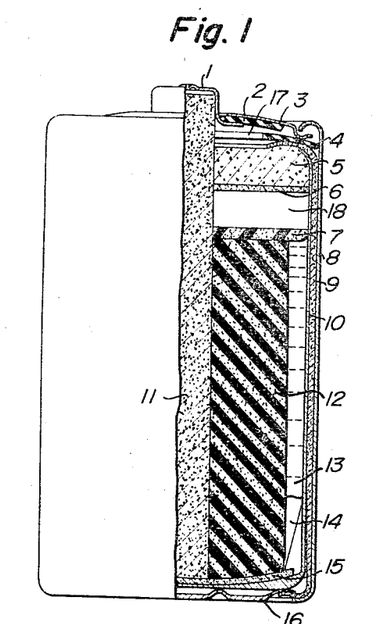
FIG. 1 is an elevational view of a conventional metal-sealed dry cell of typical type, partly in section.

Referring to FIG. 1, a conventional metal-sealed dry cell comprises a metal cap 1 serving as the positive terminal, an annular insulating washer 2, a sealing plate 3 insulated from the cap 1 by the washer 2, an insulating packing 4, a sealing layer 5, a positive carbon rod 11, and a combined negative and container 10 which is formed by cylindrical zinc containers. The sealing layer 5 closely contacts both the carbon rod 11 and the zinc container 10, for preventing electrolyte leakage and drying of the active elements of the cell. The sealing layer 5 is made of asphalt compound or the like in general.

The dry cell further comprises a paper washer 6 for supporting the sealing layer 5, a wax layer 7 for preventing corrosion at the boundary between the zinc container 10 and the electrolyte 13, as well as drying of the active elements, a metal jacket can 8 which clamps together the upper portion and the lower end of the dry cell, and a paper tubing 9 which covers the zinc container 10 and prevents leakage of the electrolyte at the end of discharge when the zinc container 10 has disappeared by electrochemical reaction. The paper tubing 9 is formed by a central asphalt layer sandwiched between opposite layers of wax-treated kraft paper. The upper end of paper tubing 9 is clamped to the upper peripheral portion of the sealing layer 5 by the upper end portion of metal jacket 8 through the sealing plate 3 and insulating packing 4, while the lower end of paper tubing 9 is clamped to the peripheral portion of the bottom plate 16 forming the negative terminal of the dry cell.

The depolarizer bobbin 12 mainly consists of manganese dioxide, and the electrolyte layer 13 consists of aqueous solution of ammonium chloride and zinc chloride, immobilized with gelatinizer, such as flour or starch, C.M.C., etc. The depolarizer bobbin 12 is insulated and separated from the zinc container 10 by a paper washer 15 forming a bottom separator. A skirt paper 14 serves as a guide for introducing the depolarizer bobbin 12 into the central portion of the zinc container 10.

The discharge capacity of a dry cell naturally depends on the combination of main materials, such as depolarizer bobbin, electrolyte, negative, etc., and the contents of these materials should necessarily be much for obtaining a large discharge capacity. Thus, these main materials may be of high purity and activity, and may be used in a large amount as far as possible in order to obtain a high discharge capacity, but there are many problems heretobefore difficult to solve with regard to construction and electrolyte leakage, and there has not been accomplished a considerable advance in increase of the discharge capacity.

These difficult-to-solve problems of conventional dry cells may be enumerated as follows:

(1) The seal portion consisting of sealing layer 5 and paper washer 6 occupies 15 to 20% of the inner volume of zinc container 10, and in addition, a useless space 17 is inevitably formed between the sealing layer 5 and sealing plate 3, and an air space 18 is required to be formed even though small, because it has a close relation with the electrolyte leakage. Consequently, it is not possible for the depolarizer bobbin 12 to be higher than a definite limit, say 40 mm. in general for flashlight cells, Type $R_{20}$ resulting in relatively short useful life.

(2) There is only an extremely little reserve for providing the air space 18, and the air space cannot endure the pressure of gases evolved from inside the cell during discharging or being left unoperated after discharge.

(3) The compound forming the sealing layer 5 is greatly affected by temperature change, and it is not durable to high temperatures over 60° C., but is frequently softened to flow out of the jacket, while, at low temperatures below about $-5°$ C., the sealing layer 5 is solidified and might crack by virtue of shock. In addition, its adhesion with the carbon rod 11 is difficult, and due to its great flowability, the sealing layer 5 is readily pushed up by the internal gas liberated during and after discharging. Moreover, its aging is remarkable, and after a storing of say one-year period, the sealing layer 5 is aged to crack. The compound is extremely viscous even at 200° C. or so, and requires a long cooling time, so that the sealing layer 5 is difficult to form, obstructing rationalization of manufacturing steps of the cell.

(4) The kraft paper tubing 9 covering the side surface of zinc container 10 contacts the electrolyte directly by reason of disappearance of zinc container 10 at the end period of discharging of the cell, resulting in penetration of electrolyte through the kraft paper tubing toward the jacket to cause corrosion thereof.

According to the present invention, the dry cell is almost free from aging, softening, and cracking of the sealing member formed of plastic material. In addition, the inner volume of the cell is almost wholly available, enabling an increase of the height of depolarizer bobbin by 10 to 20%. Moreover, the gases evolved inside, such as hydrogen gas, that constitute a cause of electrolyte leakage, can be exhausted to outside. The carbon rod or other terminal rod may be preheated for welding thereto the sealing layer formed of plastic material. The side surface of the container may also be covered by a plastic film for removing default of the prior art. The various objects of the present invention hereinbefore described can thus be accomplished.

Figure 2:
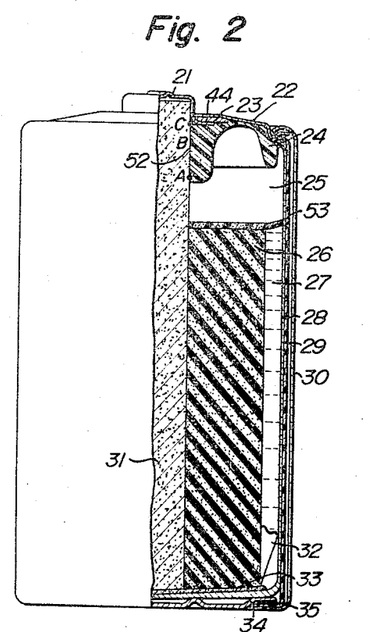
FIG. 2 is a similar view of a preferred embodiment of the present invention.

Referring now to FIG. 2, the primary cell illustrated shall be described, which is a manganese-dioxide dry cell (International Electrotechnical Commission, Publication 86, designation $R_{20}$). It comprises a nickel-plated brass cap 21 serving as the positive terminal, a sealing iron plate 22 whose peripheral portion is clamped by the bent upper end of the metal jacket 30, an annular washer 23 of soft polyvinyl chloride for insulating the sealing plate 22 from the cap 21, a sealing member 24 of polyethylene welded to the positive carbon rod 31, an air space 25, a positive depolarizer bobbin 26, a non-flowable electrolyte paste 27, a zinc container 28 serving as the negative electrode and the container and an insulating tubing 29 of thermo-contractile vinyl tube, for covering the zinc container 28 to prevent leakage of electrolyte at the end of cell discharge when the zinc container has disappeared by electrochemical reaction, and for insulating the jacket 30 from the zinc container 28.

The upper end portion of the vinyl tube 29 covers the peripheral portion of sealing member 24 and contact thereto, while the lower end portion of the tubing 29 is clamped to the peripheral portion of the bottom plate 34 serving as the negative terminal of the cell through sealing ring 35. The bottom plate 34 is formed by tin-plated iron plate. The jacket 30 is also made of tin-plated iron plate, and its upper end portion is clamped to the peripheral portion of the sealing plate 22, while the lower end portion is clamped to the peripheral portion of the bottom plate 34, together with the lower end portion of the polyvinyl chloride tube 29.

The positive carbon rod 31 is water-proof-treated by paraffin wax dissolved in an appropriate solvent such as trichloroethylene. A paper spacer 32 of tago-film paper, and a bottom paper 33 made of kraft paper are for the same purposes as elements 14 and 15 in FIG. 1, respectively. The air space 25 is defined at the bottom side by a wax coat 53.

Figure 3:
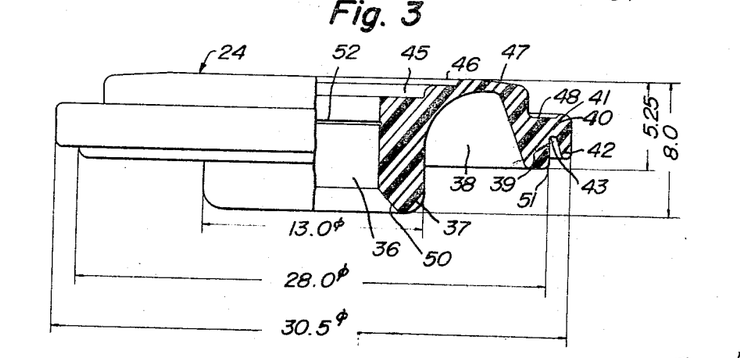
FIG. 3 is an elevational view of a sealing member employed in the cell shown in FIG. 2.

A desirable example of the sealing member 24 is shown in FIG. 3, and is mainly made of polyethylene. Soft plastics, such as polypropylene, may also be employed. A preferred polyethylene is a low-density polyethylene produced by the high-pressure method (Ziegler method), having molecular weight about 24,000 as mean value, which has the following properties.

Mechanical properties:
  Tensile strength (p.s.i.) __________________ 1,900
  Elongation (percent) ______________________ 50
  Coefficient of elasticity (p.s.i.) __________ 14,600
  Rockwell hardness _________________________ R27
  Tearing strength (lb./in.) ($t=0.075$ in.) __ 440
Thermal properties:
  Flowing point ______________________° C__ 104
  Brittlizing temperature ____________° C__ −50
Electrical properties:
  Break-down voltage (v./mm.)
    ($t=0.125$ in.) _________________________ 475
  Volumetric specific resistance ($\Omega$ cm.) ____ $10^{15}$
  Dielectric constant (60–$10^8$ cycles) _______ 2.3
Hydrogen and water-vapour penetrating power:
  $H_2$ 10.07 p. cc./cm. sec. cm.
    $Hg \times 10^{10}$ _____________________° C__ 30
  Water vapour 4.5 p. mols/cm. sec. cm.
    $Hg \times 10^{13}$ _____________________° C__ 25

The construction, operation and effect of the sealing member 24 will now be described with reference to FIGS. 2, 3 and 4.

The sealing member 24 has an axial bore 36 through which the carbon rod 31 extends. Around the axial bore 36 is formed a sleeve 37 at the lower side of the sealing member 24, and an annular space 38 is defined between the sleeve 37 and a downwardly-extending outer sleeve 39 of the sealing member 24, which outer sleeve is adapted to contact the zinc container 28. Thus, the outer sleeve 39 is provided with an annular sub-flange 40 for engaging the upper edge of the zinc container 28. The upper surface of the sub-flange 40 is provided with an annular rib 41 for defining an annular shallow groove 48 between it and the annular portion 47 which the sealing plate 22 contacts. The sub-flange 40 is also provided with an annular rib 42 downwardly extending to define a relatively deep annular groove 43 between it and the flange 39, into which groove the upper end portion 49 of zinc container 28 extends. The upper surface of the sealing member 24 is provided with an annular step 45 around the axial bore 36 for receiving the annular flange 44 of the cap 21. Around the step 45 is formed another annular step 46 for receiving the insulating ring 23, the upper surface of the annular rib 47 being flat with the upper surface of the insulating ring 23. The lower ends of the sleeve 37 and the outer sleeve 39 are formed with slant faces 50 and 51, respectively, for facilitating insertion of the carbon rod 31 and the zinc container 28 into the axial bore 36 and the groove 43, respectively. The external diameter of the flange or sleeve 39 including the sub-flange 40 is slightly larger than the internal diameter of the zinc container 28, so that, when the upper end of zinc container 28 has been press-inserted into the groove 43, a liquid-tight contact is assured between the rib 42 and the zinc container 28, and the electrolyte leakage path is elongated by virtue of the rib 42.

The annular rib 41 serves to uniformly and effectively distribute the clamping pressure during sealing operation of the upper end portions of insulating tube 29 and the ing. For this purpose, the shallow groove 48 serves to the radial thickness of sleeve 37 is increased, the elastic accommodate the upper edge portions of insulating tube 29 and the jacket 30 for providing strong clamping pressure.

The diameter of axial bore 36 is slightly smaller than the external diameter of carbon rod 31, say about 0.3 mm. or less, in order to obtain good pressure contact between the elements 24 and 31; there is not required any adhesive agent to be used for obtaining liquid-proof contact therebetween. This is due to the good pressure contact formed there by virtue of the resiliency of plastics forming the sealing member 24. In this connection, if the radial thickness of sleeve 37 is increased, the elastic force due to the resiliency is increased, and better pressure contact is obtained between the elements 24 and 31. Further, if the carbon rod 31 is preheated to a temperature above about 130° C., and then inserted into the bore 36 at the hot condition, the carbon rod 31 and the sealing member 24 are welded together, and the melted plastics of sealing member 24 partly flows into surface pores of the porous carbon rod 31, resulting in a more effective bond therebetween, and there cannot be any electrolyte leakage whatsoever.

Table I shows tensile strength obtained when a carbon rod 31 of 8 mm.-diameter has been bonded to a polyethylene sealing member 24, as above-described.

TABLE I

| Diameter (mm.) of bore 36 | Tensile strength (kg.) at 20° C. | |
| --- | --- | --- |
| | Pressure contact only between 24 and 31 | Welding is added between 24 and 31 |
| 7.8 | 9.0 | 21.0 |
| 7.6 | 10.0 | 29.0 |

"Tensile Strength" means the tensional force axially applied to the carbon rod 31 with the sealing member 24 fixed, when the rod 31 begins to move relatively to the member 24.

In addition, a circumferential groove 52 may be formed in the wall surface of the bore 36, for further preventing electrolyte leakage. Referring to FIG. 2, even in the case when the liquid electrolyte begins to leak out through any gap between the carbon rod 31 and the sealing member 24, and creeps upwardly by virtue of the inner pressure and capillary phenomena, such a creeping will be interrupted by the circumferential groove 52. Thus, there is obtained a result such as that obtained when using doubled sealing members.

The thickness of the annular portion 47 should be 0.2 to 1.0 mm. for example in flashlight cells type $R_{20}$; too thick annular portion 47 would obstruct exhaust-gas penetration therethrough, while too thin annular portion 47 would be poor in strength. Such a relatively thin annular portion 47 enables the air space 25 to be large, facilitates penetration therethrough of hydrogen and other gases liberated internally during the discharging of dry cell and to be exhausted, and enables the release of stress that would be caused by sleeves 37 and 39 when the sealing member 24 is secured to the zinc container 28. Tests show that, with the annular portion 47 of 0.5 mm. thickness, hydrogen penetration is about 0.947 cm.$^3$ during a period of one week.

Figure 4:
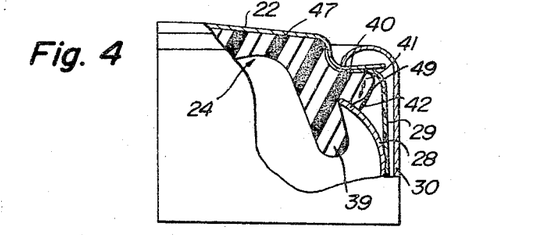
FIG. 4 shows the detailed construction of the sealing portion of the cell shown in FIG. 2.

With the above-mentioned construction, a force as shown by the double-headed arrow in FIG. 4 acts on the sub-flange 40, with the rib 41 pressing the peripheral portion of sealing plate 22, and the rib 42 pressing the bent end portion of zinc container 28, thus enabling the upper end of zinc container 28 to be clamped strongly, with no fear of the same damaging the sealing member 24 by penetrating thereinto.

With regard to the size or volume of air space 25, it is about 5.6 cm.$^3$ for flashlight cells shown in FIG. 2, while those of conventional dry cells as shown in FIG. 1 are only 1–2 cm.$^3$. That is to say, the volume of air space 25 of the present invention can be about three times the volume of air space 18 of conventional dry cell.

In this connection, various dimensions of dry cells shown in FIGS. 1 and 2, respectively, are as follows.

FIG. 1 dry cell:
  Inner diameter of zinc container 10 ____mm__ 29.9
  Height of the same ________________mm__ 54
  Thickness of bottom of the same ______mm__ 0.5
  Diameter of carbon rod 1 ___________mm__ 8
  Height of depolarizer bobbin ________mm__ 40
  Diameter of the same ______________mm__ 26
  Thickness of bottom paper 15 _______mm__ 0.8
  Thickness of base spacer 14 _________mm__ 0.1
  Total thickness of sealing layer 5 and paper washer 6 __________________________mm__ 6

FIG. 2 dry cell:
  Inner diameter of zinc container 28 ____cm__ 29.9
  Height of the same ________________cm__ 54
  Thickness of bottom of the same ______mm__ 0.5
  Diameter of carbon rod 31 __________mm__ 8
  Height of depolarizer bobbin 26 ______mm__ 46
  Diameter of the same ______________mm__ 26
  Thickness of bottom paper 33 ________mm__ 0.8
  Thickness of base spacer 32 _________mm__ 0.1

Dimensions of various parts of sealing member 24 are as shown in FIG. 3.

Preferred formulation of the depolarized bobbin 26 is shown in Table II, and the formulation of its test samples is shown in Table III.

TABLE II

| | Parts |
| --- | --- |
| Treated electrolytic manganese dioxide | 100 |
| Acetylene black | 8–30 |
| Graphite | 0–5 |
| Sal ammoniac | 15–40 |
| Zinc chloride | 3–20 |
| Water | 20–35 |

TABLE III

| | |
| --- | --- |
| Treated electrolytic manganese dioxide | 100 |
| Acetylene black | 17 |
| Graphite | 0 |
| Sal ammoniac | 27 |
| Zinc chloride | 9 |
| Water | 29 |

Preferred formulation of the electrolyte 27 is shown in Table IV, and formulation of its test samples is shown in Table V.

TABLE IV

| | Parts |
| --- | --- |
| Sal ammoniac | 30–40 |
| Zinc chloride | 10–25 |
| Water | 100 |
| Mercuric chloride | little |
| Flour | 10–25 |
| Cornstarch | 20–40 |

TABLE V

| | |
| --- | --- |
| Sal ammoniac | 37 |
| Zinc chloride | 18 |
| Water | 100 |
| Mercuric chloride | 0.3 |
| Flour | 19 |
| Cornstarch | 30 |

Thermo-contractile vinyl tube 29 is formed mainly by polyvinyl chloride, to which is mixed polyvinyl acetate or polyvinylidene chloride, or with which is copolymerized polyvinyl acetate or polyvinylidene chloride, with addition of a small amount of plasticizer and a minute amount of stabilizer. It is 0.05–0.5 mm. in thickness, and when heated, contracts both in longitudinal and latitudinal directions.

Thermoplastic resins are readily deformable under temperatures higher than their softening point but lower than their flowing point. When an extruded tube of suitable diameter and length of thermoplastic resin is heated to a temperature below its flowing point but higher than its softening point, to thermally expand the tube to a suitable diameter, and then quenched, the tube is under the condition of expansion by residual strain even at normal temperatures. When such an expanded tube is heated to a temperature above the softening point, the residual strain is removed, and the tube contracts to the diameter before the expansion. The thermo-contractile tube 29 is obtained by utilization of the above-mentioned property of thermoplastic resin. In place of such a thermo-contractile tube, an elastic tube expanded by a mechanical force to a suitable diameter may be used, and then the mechanical force may be removed.

The sealing ring 35 serves to exhaust gases and to prevent electrolyte leakage, and is made of a high-quality paper which is water-proof treated by paraffin wax dissolved in a suitable solvent such as trichloroethylene.

A preferred construction of the present dry cell is as described above, and in manufacturing the same, the conventional steps of insertion of the paper washer 6 and of forming the sealing layer 5 can be omitted, so that approximately 5 m. may advantageously be shortened in the whole manufacturing process.

The characteristics of dry cells embodying the present invention as shown in FIG. 2 and those of conventional dry cells as shown in FIG. 1 have been compared to each other by various tests and experiments described below.

1) CONSTANT-RESISTANCE DISCHARGE TESTS

Dry cells were discharged through constant resistances at a discharge temperature of 20±1° C., and characteristic curves of discharge voltage vs. discharge time for various discharge resistances are shown in Tables VI to XI and FIGS. 5 to 11, wherein No. 1 curves correspond to the present invention, while No. 2 and No. 3 curves correspond to groups A and B of conventional dry cells, respectively.

Figure 5:
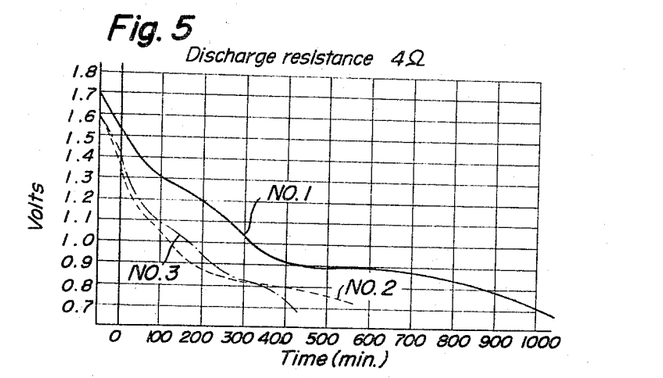
FIGS. 5 through 11 are curve diagrams showing relations between discharge voltages and discharge times, when the dry cells are discharged under a definite temperature of $20\pm1°$ C., through fixed resistances of different values. In these figures of drawings, No. 1 curves correspond to dry cells of the present invention, while No. 2 and No. 3 curves to conventional cells of groups A and B, respectively.

Table VI shows the results of continuous discharges through 4Ω resistance as shown in FIG. 5.

TABLE VI

| Discharge resistance (Ω) | No. 1 | | | No. 2 | | | No. 3 | | |
|---|---|---|---|---|---|---|---|---|---|
| | 1.0 v. | 0.9 v. | 0.8 v. | 1.0 v. | 0.9 v. | 0.8 v. | 1.0 v. | 0.9 v. | 0.8 v. |
| 2 | 122 min | 260 min | 440 min | 55 min | 102 min | 195 min | 67 min | 109 min | 150 min |
| 3 | 219 min | 540 min | 690 min | 87 min | 163 min | 360 min | 135 min | 197 min | 257 min |
| | | | 875 min | | | 390 min | | | 350 min |
| 10 | 20 hrs | 43 hrs | 52 hrs | 9 hrs | 15 hrs | 27 hrs | 12 hrs | 18 hrs | 24 hrs |
| | | | 239 hrs | | | 120 hrs | | | 149 hrs |
| 25 | 650 hrs | 750 hrs | 805 hrs | | | | 390 hrs | 445 hrs | 530 hrs |
| 1,000 | 13 months | 13.5 months | 14 months | | | | 9.7 months | 10.8 months | 11.3 months |

Figure 6:
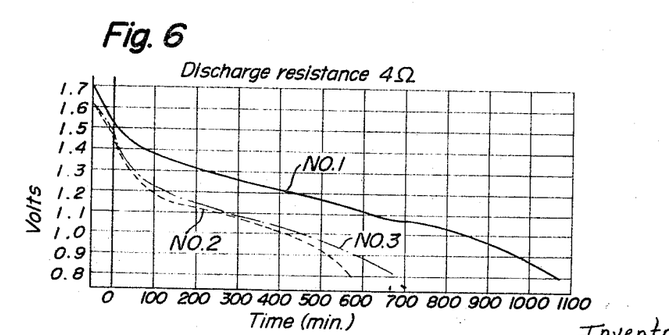
Figure 7:
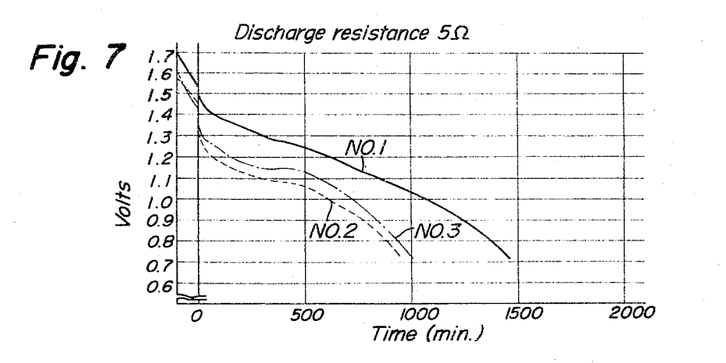

Table VII shows the results of tests where cells were discharged for 30 minutes every day. The test results for 4Ω-discharging and 5Ω-discharging are shown in FIGS. 6 and 7, respectively.

TABLE VII

| Discharge resistance (Ω) | No. 1 | | No. 2 | | No. 3 | |
|---|---|---|---|---|---|---|
| | 0.85 v., min. | 0.75 v., min. | 0.85 v., min. | 0.75 v., min. | 0.85 v., min. | 0.75 v., min. |
| 2 | 370 | | 160 | | 180 | |
| 3 | 610 | | 330 | | 430 | |
| 4 | 1,020 | | 550 | | 640 | |
| 5 | 1,300 | 1,420 | 830 | 930 | 890 | 980 |

Figure 8:
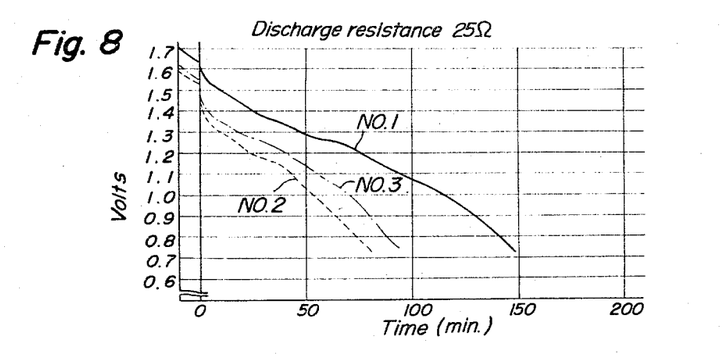

Table VIII shows the results of tests where cells were discharged for 4 hours every day, and those for 25Ω-discharging is shown in FIG. 8.

TABLE VIII

| Discharge resistance (Ω) | No. 1 | | | No. 2 | | | No. 3 | | |
|---|---|---|---|---|---|---|---|---|---|
| | 1.1 v., hrs. | 1.0 v., hrs. | 0.9 v., hrs. | 1.1 v., hrs. | 1.0 v., hrs. | 0.9 v., hrs. | 1.1 v., hrs. | 1.0 v., hrs. | 0.9 v., hrs. |
| 10 | | | 29.4 | | | 12.7 | | | 17.0 |
| 25 | 94 | 114 | | 43 | 53 | | 55 | 70 | |
| 40 | | | 230 | | | 120 | | | 140 |
| 83.3 | | | 500 | | | 320 | | | 380 |
| 125 | 750 | 860 | 1,000 | | | | 300 | 550 | 620 |

Figure 9:
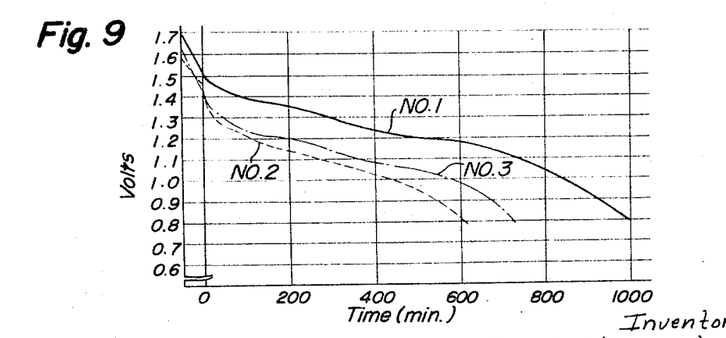

Table IX shows the results of tests where cells were discharged through 4-ohm resistances for 4 minutes and then after 56-minute stoppage of discharges, next 4-minute discharges were effected, such procedures being repeated continuously for 8 hours every day. The result is also shown in FIG. 9.

TABLE IX

| | Service time (minutes) | |
|---|---|---|
| | 1.1 v. | 0.9 v. |
| No. 1 | 720 | 930 |
| No. 2 | 270 | 540 |
| No. 3 | 730 | 670 |

Figure 10:
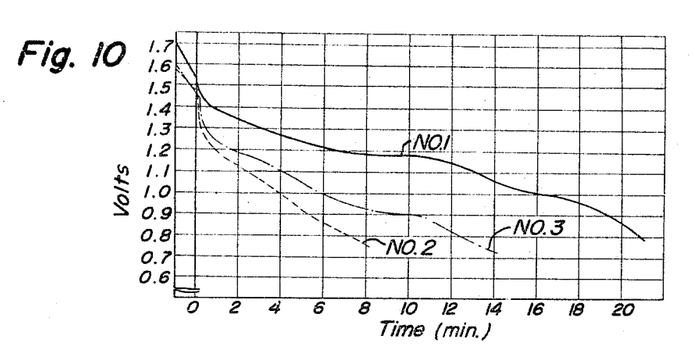

Table X shows the results of tests wherein cells were discharged through 5.6-ohm resistances for 2 hours continuously every day for 6 days, the results being shown also in FIG. 10.

TABLE X

| | Service time (hours) | | |
|---|---|---|---|
| | 1.1 v. | 1.0 v. | 0.9 v. |
| No. 1 | 13 | 15.8 | 19.2 |
| No. 2 | 2.4 | 3.8 | 5.2 |
| No. 3 | 4 | 5.9 | 9.8 |

Figure 11:
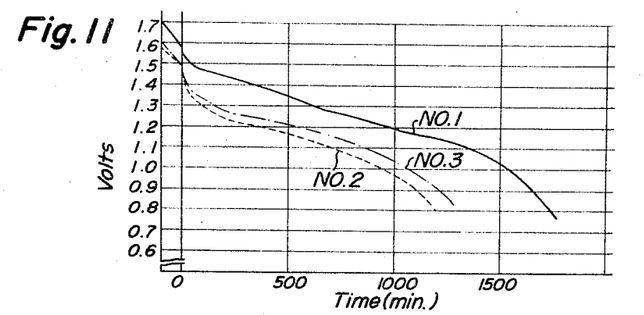

Table XI shows the results of tests where cells were discharged through 6.67-ohm resistances for 4 minutes, and then after 56-minute stoppage of discharges, next 4-minute discharges and 56-minute stoppages were repeated for 10 hours every day, the results being shown also in FIG. 11.

TABLE XI

Service time, min., 0.93 v.

| | |
|---|---|
| No. 1 | 1610 |
| No. 2 | 1080 |
| No. 3 | 1170 |

Thus, it has been confirmed that the cells of present invention have constant-resistance-discharge sustaining time or capacity about 1.5 to 3 times that of conventional cells.

(2) CONSTANT-CURRENT DISCHARGE TEST

Figure 12:
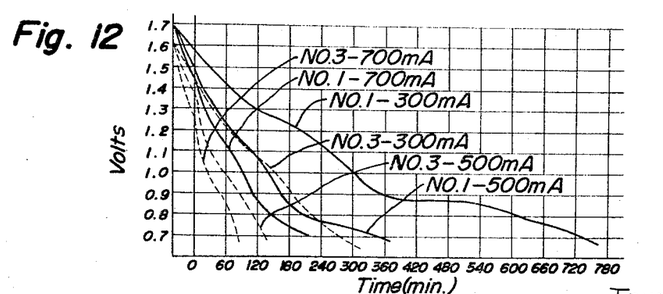
FIGS. 12 through 16 are curve diagrams showing results of various tests and experiments, respectively, for showing various characteristics and performances of the present dry cells, which are superior to those of conventional dry cells.

Cells were discharged with constant currents at a temperature of 20±1° C., and the results are shown in Table XII and FIG. 12. No. 1 cells are of the present invention, while No. 3 cells are conventional cells of group B.

TABLE XII

| Discharge current, ma. | No. 1 | | No. 3 | |
|---|---|---|---|---|
| | 1.1 v., min. | 0.9 v., min. | 1.1 v., min. | 0.9 v., min. |
| 300 | 252 | 360 | 105 | 185 |
| 500 | 114 | 167 | 36 | 84 |
| 700 | 69 | 113 | 18 | 54 |

Thus, it has been confirmed that the constant-current discharge service times of the present dry cells are about 2 to 3.5 times those of conventional cells.

(3) ELECTROLYTE LEAKAGE

The results of tests with regard to electrolyte leakage are shown in Table XIII. The conventional cells under test are of group A and show wide ranges of variations in number of leakage default.

TABLE XIII

| Test procedure | Number of cells leaked | |
|---|---|---|
| | Present invention | Conventional |
| Continuously discharged through 4-ohm resistance until the time when terminal voltage drops to 0.7 v. | 0 | 0 |
| Continuously discharged through 4-ohm resistance for 24 hours, and then left open-circuited at 20° C. for 15 days | 0 | 0–75 |
| Continuously discharged through 4-ohm resistance for 24 hours, and then left open-circuited at 20° C. for 50 days | 0 | 15–100 |
| Continuously discharged through 4-ohm resistance for 24 hours, and then left open-circuited at 20° C. for 30 days | 0 | 0–100 |
| Continuously discharged through 1-ohm resistance at 0° C. for 30 days | 0 | 20–100 |
| Continuously discharged through 4-ohm resistance at 30° C. for 30 days | 0 | 0–100 |
| Continuously discharged through 125-ohm resistance at 30° C. for 60 days | 2 | 6–100 |

It is then clear that there is little fear of electrolyte leakage in dry cells of the present invention.

(4) STORAGE PERIODS

Figure 13:
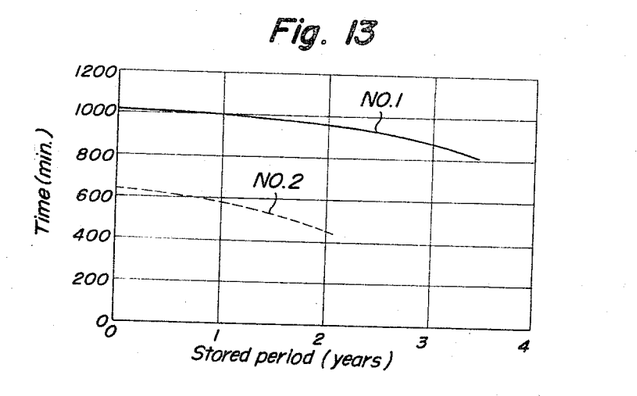

FIG. 13 shows decreases in sustaining periods of the cells until the voltages drop to 0.85 volt by discharges through 4-ohm resistances from 30 minutes every day. This reveals that conventional cells (No. 2) cannot be stored beyond for about two years, but the present dry cells can be stored for about three years, with loss of capacity of only about 10%.

(5) INFLUENCE OF TEMPERATURE

Conventional dry cells cannot operate at low temperatures below —15° C. or —20° C., as the electrolytes freeze up. In addition, below —5° C., for example, the sealing layer compounds become brittle and tend to cause electrolyte leakage. On the other hand, at high temperatures above 60° C., for example, the compounds become soft to flow out, resulting in flowing out of electrolytes. Thus, the operative range of conventional dry cells are from about —5° C. to about 60° C.

Because of the fact that the present invention employs a sealing member 24 of soft plastics, electrolyte leakage at low temperatures, and flowing out of compounds or electrolytes at high temperatures do not occur, so that stable performances are expected over a wide range of —15° C. to 100° C., without fear of electrolyte leakage nor deformation of sealing layers.

Figure 14:
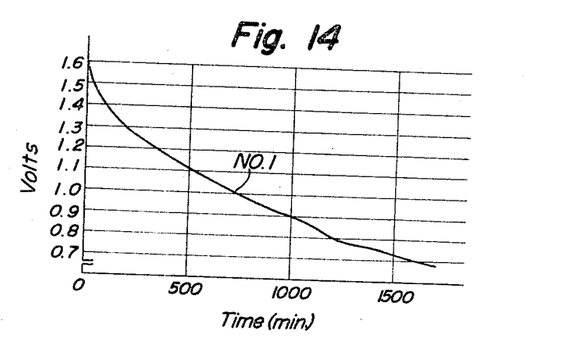

FIG. 14 shows the results of continuous discharging of the new dry cells at 100° C. through 4-ohm resistance. Conventional cells did not operate at such a high temperature.

Figure 15:
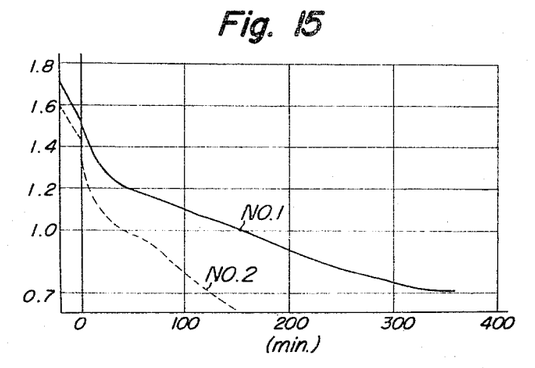

FIG. 15 shows the results of continuous discharging at —15° C. through 4-ohm resistance. The service times of such dischargings are shown in Table XIV.

TABLE XIV

| Temperature, ° C. | No. 1 0.75 v., min. | No. 2 0.75 v., min. |
|---|---|---|
| 100 | 1,400 | (¹) |
| —15 | 305 | 112 |

¹ No discharging.

Figure 16:
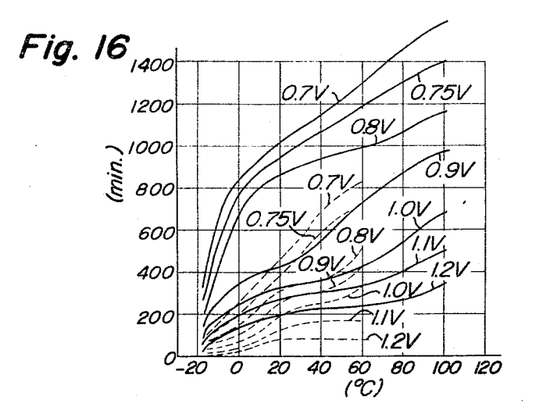

From the above, as well as, from FIG. 16 of the drawings, it is obvious that the present invention provides very good temperature characteristics in comparison to conventional dry cells. Particularly, even at a low temperature of —15° C. or so, the new dry cells have useful life of about three times that of conventional ones. In addition, deterioration during storage at high temperatures is far less than conventional ones.

FIG. 16 shows relations between temperatures and service times for respective cutoff voltages, when cells were continuously discharged through 4-ohm resistance. Solid line curves correspond to new dry cells, and broken line curves to conventional ones of group A.

Dry cells of the present invention (No. 1), and conventional dry cells of two different groups (No. 4 and No. 5) were stored at 90° C. for 8 hours, and then left at normal temperature for ten days. These cells were discharged continuously at 20±1° C. through 4-ohm resistances. No. 4 cells show flowing out of sealing layers and electrolyte leakage during the storing, and No. 5 cells show electrolyte leakage at cap portions, and corrosion proceeded during normal-temperature discharging. On the contrary, No. 1 cells did not show anything wrong. Their characteristic changes are shown in Table XV.

TABLE XV

| | Service time in minutes to 0.75 v. by discharging through 4-ohm resistance | | Deterioration rate (percent) | Proportion before exposure (percent) | Proportion after exposure (percent) |
|---|---|---|---|---|---|
| | Before exposure to high temp. | After exposure to high temp. | | | |
| No. 1 | 960 | 860 | 10 | 100 | 100 |
| No. 4 | 353 | 250 | 29 | 37 | 30 |
| No. 5 | 650 | 240 | 63 | 68 | 28 |

(6) INFLUENCE OF HUMIDITY

Conventional dry cells deteriorate remarkably under high-humidity atmosphere, in general, but dry cells of the present invention (No. 1) do not show any deterioration substantially, even under such a high humidity that dew may fall on the cell casings.

Under severe conditions, such as a high temperature of 70±2° C. and high humidity of 90±2%, the cells were stored for definite periods, and then discharged under the same conditions continuously through 4-ohm resistances to 0.75 v. No. 1 cells did not show any change until the experiments were completed, but No. 3 cells show flowing-out of sealing compound after storage for one day, and the compound flowing-out increased day by day, the manner of deterioration of such cells being shown in Table XVI. No. 1 cells were tested up to 60-day storing, but preserved 671-minute capacity.

TABLE XVI

| Period of storing | Characteristics | No. 1 | No. 3 |
|---|---|---|---|
| Before storing | Voltage (v.) | 1.68 | 1.60 |
|  | Current (a.) | 7.5 | 6.6 |
|  | Capacity (minutes) | 960 | 380 |
| 1 day | Voltage (v.) | 1.685 | 1.62 |
|  | Current (a.) | 10.8 | 9.9 |
|  | Capacity (minutes) | 1,195 | 768 |
| 5 days | Voltage (v.) | 1,645 | 1.57 |
|  | Current (a.) | 11.0 | 8.6 |
|  | Capacity (minutes) | 1,262 | 67.3 |
| 10 days | Voltage (v.) | 1.625 | 1.55 |
|  | Current (a.) | 10.5 | 7.7 |
|  | Capacity (minutes) | 1,331 | 633 |
| 20 days | Voltage (v.) | 1.58 | 1.45 |
|  | Current (a.) | 10.0 | 4.7 |
|  | Capacity (minutes) | 1,181 | 521 |
| 30 days | Voltage (v.) | 1.55 | 1.44 |
|  | Current (a.) | 8.0 | 3.5 |
|  | Capacity (minutes) | 940 | 240 |

(7) WATER-PROOFNESS TESTS

(i) In-water maintenance test

Dry cells were immersed into water-service water and left at normal temperature for 40 days. After then, the cells were taken out and water wiped out of the cells. The cells were then continuously discharged at 20±1° C. through 4-ohm resistances. The results are shown in Table XVII.

TABLE XVII

| Immersion period | Characteristics | No. 1 | No. 3 |
|---|---|---|---|
| 10 days | Voltage (v.) | 1.70 | 1.60 |
|  | Current (a.) | 8.35 | 7.31 |
| 40 days | Appearance | (1) | (1) |
|  | Voltage (v.) | 1.68 | 1.58 |
|  | Current (a.) | 8.32 | 7.33 |
|  | Capacity (minutes): |  |  |
|  | To 1.2 v. | 187 | 45 |
|  | To 1.0 v. | 310 | 160 |
|  | To 0.75 v. | 960 | 465 |

[1] Jacket print discoloured slightly.

(ii) Maintenance test in sea-water

Dry cells were immersed into 3% table-salt water, and left at normal temperature for 11 days. Changes in characteristics are shown in Table XVIII.

TABLE XVIII

|  | Characteristics | No. 1 | No. 3 |
|---|---|---|---|
| Before immersion | Voltage (v.) | 1.72 | 1.62 |
|  | Current (a.) | 8.60 | 7.77 |
| After one-day immersion | Voltage (v.) | 1.70 | 1.585 |
|  | Current (a.) | 8.36 | 7.57 |
| After 7-day immersion | Voltage (v.) | 1.66 | 1.50 |
|  | Current (a.) | 7.97 | 6.89 |
| After 11-day immersion | Voltage (v.) | 1.64 | 1.48 |
|  | Current (a.) | 7.70 | 6.61 |

(iii) Discharge test in boiling water

Dry cells of the present invention were immersed into boling water of 100° C., and after ten minutes has elapsed, were discharged continuously through 4-ohm resistance. The results are shown in Table XIX.

TABLE XIX

|  | Voltage (v.) | Appearance |
|---|---|---|
| After 0 hour | 1.69 | No change. |
| After 2 hours | 1.40 | Do. |
| After 4 hours | 1.32 | Do. |
| After 6 hours | 1.24 | Do. |
| After 8 hours | 1.23 | Do. |

What we claim is:

1. A primary cell consisting of a zinc container forming the negative electrode of said cell, a carbon rod forming the positive electrode of said cell, and a depolarizing mixture and an electrolyte both enclosed in said zinc container, said container having a sealing member of soft plastic having a centrally formed sleeve providing a central bore, for penetration therethrough of said carbon rod, having a diameter smaller than that of said carbon rod, said central sleeve having a slant lower face, a concentric peripheral outer sleeve in contact with the upper end portion of said zinc container and provided with a slant face at the lower end, a peripheral sub-flange formed on said outer sleeve with an upper annular rib, and a lower annular rib for forming an annular groove between itself and said outer sleeve for insertion of the upper end portion of said zinc container, a positive terminal cap covering the top end of said carbon rod, said sealing member being provided with an annular step for receiving the peripheral portion of said terminal cap, an insulating ring and a sealing plate for securing said terminal cap to said carbon rod, said sealing member being provided with another annular step encircling said first-mentioned annular step for receiving said insulating ring, an annular portion for supporting said sealing plate, and an annular groove formed between said annular portion and said upper annular rib, the open end of said zinc container being positively sealed by said sealing member, a tube of thermo-contractile resin covering the side surface of said zinc container with its upper end portion in close contact with said sub-flange of said sealing member, and a metal jacket for enclosing therein said zinc container with said tube, the upper and lower ends of said jacket being bent inwardly for respectively sealing both ends of said zinc container.

2. A primary cell comprising a container having power generating elements including a current collecting terminal rod installed therein, said container having an open end sealed by a flexible plastic sealing member, said sealing member having an inner sleeve provided with a bore formed concentrically with said sleeeve, said bore being smaller in diameter than the diameter of said terminal rod and said terminal rod being fitted thereinto, said sealing member having an outer sleeve provided with an annular subflange including an annular rib downwardly extending to define an annular groove between it and said outer sleeve, the upper end of said container being fitted into said groove with the upper end portion of the inner wall of said groove contacting the upper inside wall of said container, the lower end portions of said inner wall having a slant surface so that the outside diameter of the lower end thereof is smaller than the inside diameter of the upper end of said container, said inner and outer sleeves of said sealing member being formed concentrically and integrally with a relatively thin portion continuously interposed therebetween, said sealing member being provided with a recessed portion on the upper peripheral edge thereof, the outer side surface of said container being covered by a thin film plastic tubular body the upper end of which is adhered closely to said recessed portion of said sealing member, a jacket positioned around said container, a sealing plate positioned upon said sealing member, and the upper end of said jacket being bent on the periphery of said sealing plate and the lower end of said jacket being bent inwardly, whereby both ends of said container are sealed.

3. A primary cell comprising a container having power generating elements including a current collecting terminal rod installed therein, said container having an open end sealed by a flexible plastic sealing member, said sealing member having an inner sleeve provided with a bore formed concentrically with said inner sleeve, said bore being smaller in diameter than the diameter of said terminal rod and said terminal rod being fitted thereinto, said sealing member having an outer sleeve provided with an annular subflange including an annular rib downwardly extending to define an annular groove between it and said outer sleeve, the upper end of said container being fitted into said groove with the upper end portion of the inner wall of said groove contacting the upper inside wall of said container, the lower end portion of said inner wall having a slant surface so that the outside diameter of the lower end thereof is smaller than the inside diameter of the upper end of said container, said inner and outer sleeves of said sealing member being formed concentrically and integrally with a relatively thin portion, continuously interposed therebetween, said subflange including an annular rib provided on the upper peripheral edge thereof, a recesesd portion provided on the inner side of said annular rib, the outer side surface of said container being covered by a thin film plastic tubular body the upper end of which is adhered closely to said recessed portion of said sealing member, a jacket into which said container is inserted, a sealing plate positioned upon said sealing member, and the upper end of said jacket being bent on the periphery of said sealing plate and the lower end of said jacket being bent inwardly, whereby both ends of said container are sealed.

References Cited by the Examiner
UNITED STATES PATENTS

| 2,595,963 | 5/1952 | Lewis et al. | 136—133 X |
| 2,642,471 | 6/1953 | Reinhardt et al. | 136—133 |
| 3,090,824 | 5/1963 | Reilly et al. | 136—133 X |

FOREIGN PATENTS

| 244,004 | 6/1960 | Australia. |
| 1,213,467 | 4/1960 | France. |

WINSTON A. DOUGLAS, *Primary Examiner.*

D. L. WALTON, *Assistant Examiner.*